W. D. BANCROFT.
MANUFACTURE OF CARBON BLACK AND OTHER SOLID REACTION PRODUCTS.
APPLICATION FILED JAN. 3, 1920.
1,390,480.　　　　　　　　　　　Patented Sept. 13, 1921.
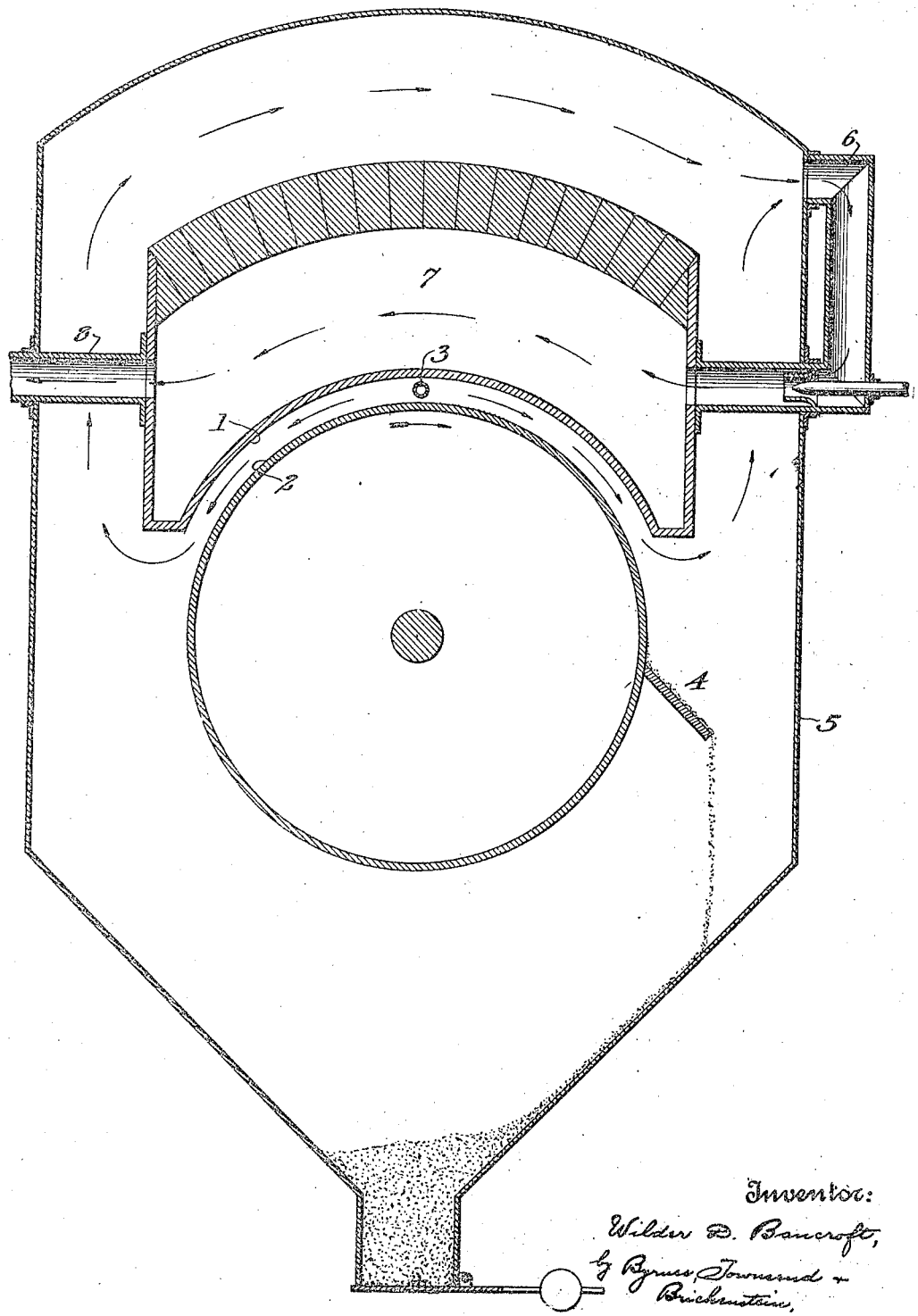

UNITED STATES PATENT OFFICE.

WILDER D. BANCROFT, OF ITHACA, NEW YORK.

MANUFACTURE OF CARBON-BLACK AND OTHER SOLID REACTION PRODUCTS.

1,390,480.    Specification of Letters Patent.  Patented Sept. 13, 1921.

Application filed January 3, 1920. Serial No. 349,138.

*To all whom it may concern:*

Be it known that I, WILDER D. BANCROFT, a citizen of the United States, residing at Ithaca, in the county of Tompkins and State of New York, have invented certain new and useful Improvements in the Manufacture of Carbon-Black and other Solid Reaction Products, of which the following is a specification.

This invention is a novel process applicable to the conduct of certain high-temperature reactions in the course of which a gas or gas-mixture (including vapors or vapor-mixtures) yields a finely divided, solid reaction product. An illustrative example of such a reaction is the production of carbon black from natural gas or equivalent hydrocarbon mixtures or vaporized hydrocarbons. According to the present invention, in carrying out this or similar gas reactions yielding a solid reaction product in a state of minute division, I establish in proximity to the reaction zone, which is usually bounded by a metallic or other surface, a temperature-gradient having for its purpose and effect the rapid removal of the solid reaction product, or a substantial proportion thereof, from the region of maximum temperature to a point outside the zone of reaction.

It is known that dust particles suspended in air and introduced between very closely spaced parallel surfaces maintained at differing temperatures, tend to move toward and to deposit upon the cooler surface. (Aitken, *Transactions Royal Society*, Edinburgh. Vol. 32, p. 239, 1884 "On the Formation of Small Clear Spaces in Dusty Air"). However, so far as I am aware, no industrial use has ever been made or proposed to be made of this tendency of solid particles to move along a heat-gradient. I employ this principle to effect the rapid removal of solid particles from a reaction zone, in those cases where the prolonged action of heat would be injurious to the product or detrimental to the efficiency of the reaction.

Carbon black is now commonly made by burning natural gas with a proportion of air insufficient for complete combustion, and causing the flame to impinge on a cold surface. The quality of the carbon black thus produced is good, but the yield is only about 1% of the total carbon content of the gas.

Yields up to 40% are said to have been obtained by cracking natural gas in contact with a highly heated surface such as pumice, but the quality of the product so produced is poor. I believe that the inferior quality of this product is due to the fact that the conditions of operation necessitate its remaining for considerable periods in the heat zone.

In contradistinction to the foregoing, I crack the gas at a heated surface, but under such conditions that a material proportion at least of the resulting carbon is immediately and positively transferred to a relatively cool surface. Thereby I obtain improved yields, and also a product of satisfactory quality; results which cannot be coincidently secured by either of the known processes mentioned above.

As a means for effecting the removal of the carbon particles from the heated zone, I establish a sufficient heat-gradient from the hot cracking surface to a relatively cool collecting surface. I prefer a temperature gradient of the order of 100° C. per centimeter, although my invention is not limited thereto.

My invention is not restricted to the use of any particular type of apparatus. Suitable apparatus may comprise simply opposed parallel plane or curved surfaces, disposed in the reaction chamber, arranged at any desired angle, and provided with means for maintaining them at widely differing temperatures, the higher temperature approximating the optimum for the particular reaction in question. For example in the particular case chosen for illustration the cracking surface may be of copper or other refractory metal or alloy, heated in any suitable manner as for instance by a flame from the waste hydrogen from the cracking operation, to about the optimum cracking temperature for the particular hydrocarbon or hydrocarbon mixture to be treated. For methane or mixtures rich in methane this temperature is upward of 1200° C. The use of steam or other addition serving in any way to facilitate the reaction or to assist the operation is within the scope of my invention. The opposing or collecting surface is preferably water- or steam-cooled. A temperature-gradient as mentioned above, of about 100° C. per centimeter, would in this case be obtained with an interspace of the order of 10 centimeters. Preferably the highly heated surface will be disposed above the cooler surface, in order to take advantage of the effects of gravitation upon the solid particles as well as upon the heated gas. Any suitable mechanical means may be provided for the continuous or intermittent discharge of the collected solid, such for example as scrapers, the provision of a moving water-cooled conveyer as a collecting surface, &c.

Copper and certain other metals and alloys are believed to be capable of exerting a favorable catalytic effect on the cracking reaction, but under the conditions heretofore obtaining in this art it has been impossible to observe any continued effect due to the cracking surfaces, since these are quickly coated by carbon. It is an advantage of my invention that it tends to keep the cracking surface free from a deposit of carbon, and thus to permit the effective use of desirable catalysts, including copper, nickel, nickel alloys and carbids, &c.

A simple form of apparatus illustrative of the invention is diagrammatically shown in the accompanying drawing in which the figure is a central vertical section. In said figure the heated or cracking surface is represented at 1, and the cooled or collecting surface at 2, the temperature gradient being maintained between these surfaces as already described. The hydrocarbon gas is distributed between the surfaces, as by a perforated pipe 3. The cooled surface 2 in the illutsration takes the form of a water- or steam-cooled drum, having a slow movement of rotation in the direction indicated by the arrow, the deposited lamp-black being removed by a scraper 4, and falling to the bottom of the receptacle 5, from which it may be removed as desired. The combustible gases escaping from the cracking zone are withdrawn at 6, and part or all of them may be re-injected with sufficient air for their combustion, into the combustion chamber 7, surmounting the cracking plate 1. The products of combustion escape at 8.

It is within the scope of my invention to assist and accelerate the transfer of the solid reaction product to the collecting surface by known means, including the use of an electric discharge as in the known electrical precipitation processes.

I claim:—

1. Process of removing a finely divided reaction product from a reaction zone, comprising maintaining in proximity to said reaction zone a temperature-gradient sufficient to effect a transfer of a material proportion of the solid product to a cooler zone, and collecting said solid product.

2. Process of making carbon black, comprising cracking a gaseous hydrocarbon in contact with a highly heated surface, and maintaining in proximity to said surface a temperature-gradient sufficient to effect a transfer of a material proportion of the carbon to a cooler zone.

3. Process according to claim 2 in which the temperature-gradient is of the order of 100° C. per centimeter.

In testimony whereof, I affix my signature.

WILDER D. BANCROFT.